US008719717B2

(12) United States Patent
Kalu (10) Patent No.: US 8,719,717 B2
(45) Date of Patent: May 6, 2014

(54) METHOD AND APPARATUS FOR SHARING CALENDAR DATABASES (75) Inventor: Kalu Onuka Kalu, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 724 days.

(21) Appl. No.: 12/504,907

(22) Filed: Jul. 17, 2009

(65) Prior Publication Data

US 2011/0016413 A1 Jan. 20, 2011

(51) Int. Cl.
*G06F 3/048* (2013.01)

(52) U.S. Cl.
USPC .......................................... 715/763

(58) Field of Classification Search
USPC ............... 715/741–743, 744, 751, 963, 763; 713/176, 182–186; 235/462.01–462.49
See application file for complete search history.

(56) References Cited

U.S. PATENT DOCUMENTS

| 6,061,064 | A  | * | 5/2000  | Reichlen | 345/418 |
| 6,353,436 | B1 | * | 3/2002  | Reichlen | 345/427 |
| 7,389,928 | B2 | * | 6/2008  | Lubow | 235/462.01 |
| 7,546,956 | B2 | * | 6/2009  | Adams et al. | 235/472.01 |
| 7,769,345 | B2 | * | 8/2010  | Johnson et al. | 455/41.1 |
| 2004/0258275 | A1 | | 12/2004 | Rhoads | |
| 2006/0065712 | A1 | * | 3/2006 | Ozaki et al. | 235/375 |
| 2006/0178916 | A1 | | 8/2006 | Domnin | |
| 2007/0038516 | A1 | * | 2/2007 | Apple et al. | 705/14 |
| 2007/0192872 | A1 | * | 8/2007 | Rhoads et al. | 726/26 |
| 2008/0191025 | A1 | * | 8/2008 | Harris | 235/462.41 |
| 2008/0272905 | A1 | | 11/2008 | Higaki et al. | |
| 2009/0089581 | A1 | * | 4/2009 | Bishop et al. | 713/168 |
| 2009/0282124 | A1 | * | 11/2009 | Rauhala et al. | 709/216 |
| 2010/0213251 | A1 | * | 8/2010 | Hvidtfeldt | 235/375 |
| 2012/0054589 | A1 | * | 3/2012 | Berger et al. | 715/202 |

FOREIGN PATENT DOCUMENTS

DE 102005001723 A1 7/2006
WO WO 2008/040004 A2 4/2008

OTHER PUBLICATIONS

European Patent Application No. EP 09 16 5834 Search Report dated Mar. 5, 2010.

* cited by examiner

*Primary Examiner* — Enrique Iturralde
(74) *Attorney, Agent, or Firm* — Perry + Currier Inc.

(57) ABSTRACT

A method and mobile computing device for sharing a calendar database stored at a second computing device, are provided. The mobile computing device comprises a processer and, interconnected thereto, a memory and a photo acquisition module. An image of a graphical indicator of the calendar database is acquired at the mobile computing device. The image of the graphical indicator is processed, at the processor, to extract an identifier of the calendar database to access the calendar database and store at least a portion of the calendar database in the memory.

16 Claims, 6 Drawing Sheets

METHOD AND APPARATUS FOR SHARING CALENDAR DATABASES

FIELD

The specification relates generally to calendar databases, and specifically to a method, system and apparatus for sharing calendar databases.

BACKGROUND

Modern electronic communication devices are generally enabled with the ability to process different sets of calendar data and the ability for a set of calendar data to be shared with other communication devices so that multiple communication devices associated with different shared sets of calendar data can add/update/remove events from the set, or group of sets, of shared calendar data (e.g. a family shared calendar). However, in order to share sets in, for example, Web-based calendars such as Google Calendar and 30 Boxes, a calendar service website must be accessed (e.g. logged into), and the textual data must be received indicating how the set of calendar data associated with the calendar service website is to be shared. For example, data identifying another account on the calendar service website must be received. On wireless communication devices, shared sets calendar data are not generally available.

BRIEF DESCRIPTIONS OF THE DRAWINGS

Embodiments are described with reference to the following figures, in which.

DETAILED DESCRIPTION OF THE EMBODIMENTS

A first aspect of the specification provides a method for sharing a calendar database with a mobile computing device, the calendar database stored at a second computing device, the mobile computing device comprising a processor and, interconnected thereto, a memory and a photo acquisition module. The method comprises acquiring, at the mobile computing device, an image of a graphical indicator of the calendar database. The method further comprises processing the image of the graphical indicator to extract, at the processor, an identifier of the calendar database to access the calendar database and store at least a portion of the calendar database in the memory.

The image can be acquired at the photo acquisition module.

The method can further comprise at least one of providing a representation of the portion at a display of the mobile computing device and generating, at the display, at least one reminder of event data stored in the portion.

The method can further comprise extracting a first portion of the calendar database from the graphical indicator, at least a portion of the event data of the calendar database graphically embedded in the graphical indicator.

Processing the image of the graphical indicator of the calendar database, at the processor, to access the calendar database can comprise: transmitting the identifier to the second computing device via a communications network; and receiving the portion from the second computing device. The graphical indicator of the calendar database can be generated by the second computing device, and acquiring, at the mobile computing device, the image of the graphical indicator of the calendar database can comprise acquiring the image of the graphical indicator from a display of the second computing device. The graphical indicator of the calendar database can be generated by a third computing device, and acquiring, at the mobile computing device, the image of the graphical indicator of the calendar database can comprise acquiring the image of the graphical indicator from a display of the third computing device. The communications network can comprise at least one of a wireless network, a wired network and a local communications network established between the mobile computing device and the second computing device. The second computing device can comprise a calendar server.

The method can further comprise periodically attempting to access the second computing device to acquire updated calendar data from the calendar database. If periodically attempting to access the second computing device is unsuccessful for at least one of a given number of times and a given time period, at least a portion of the calendar database can be deleted from the memory. If the updated calendar data fails to contain new event data for at least one of a given number of times and a given time period, the at least a portion of the calendar database can be deleted from the memory.

A second aspect of the specification provides a mobile computing device for sharing a calendar database stored at a second computing device. The mobile computing device comprises a processer and, interconnected thereto, a memory and a photo acquisition module. The processor is enabled to acquire, via the photo acquisition module, an image of a graphical indicator of the calendar database. The processor is Her enabled to process the image of the graphical indicator to extract an identifier of the calendar database to access the calendar database. The processor is further enabled to store at least a portion of the calendar database in the memory.

The mobile computing device can further comprise a display, and wherein the processor can be further enabled to at least one of: control the display to provide a representation of the portion; and control the display to generate at least one reminder of event data stored in the portion.

The processor can be enabled to extract a first portion of the calendar database from the graphical indicator, at least a portion of the event data of the calendar database graphically embedded in the graphical indicator.

To process the image of the graphical indicator of the calendar database to access the calendar database, the processor can be further enabled to: transmit the identifier to the second computing device via a communications network; and receive the portion from the second computing device. The graphical indicator of the calendar database can be generated by the second computing device, and wherein to acquire the image of the graphical indicator of the calendar database, the processor can be enabled to acquire the image of the graphical indicator from a display of the second computing device.

The graphical indicator of the calendar database can be generated by a third computing device, and wherein to acquire the image of the graphical indicator of the calendar database, the processor can be enabled to acquire the image of the graphical indicator from a display of the third computing device.

The communications network can comprise at least one of a wireless network, a wired network and a local communications network established between the mobile computing device and the second computing device.

The processor can be further enabled to periodically attempt to access the second computing device to acquire updated calendar data from the calendar database. If periodic attempts to access the second computing device are unsuccessful for at least one of a given number of times and a given time period, the processor can be enabled to delete at least a portion of the calendar database from the memory. If the updated calendar data fails to contain new event data for at least one of a given number of times and a given time period, the processor can be enabled to delete at least a portion of the calendar database from the memory.

Figure 1:
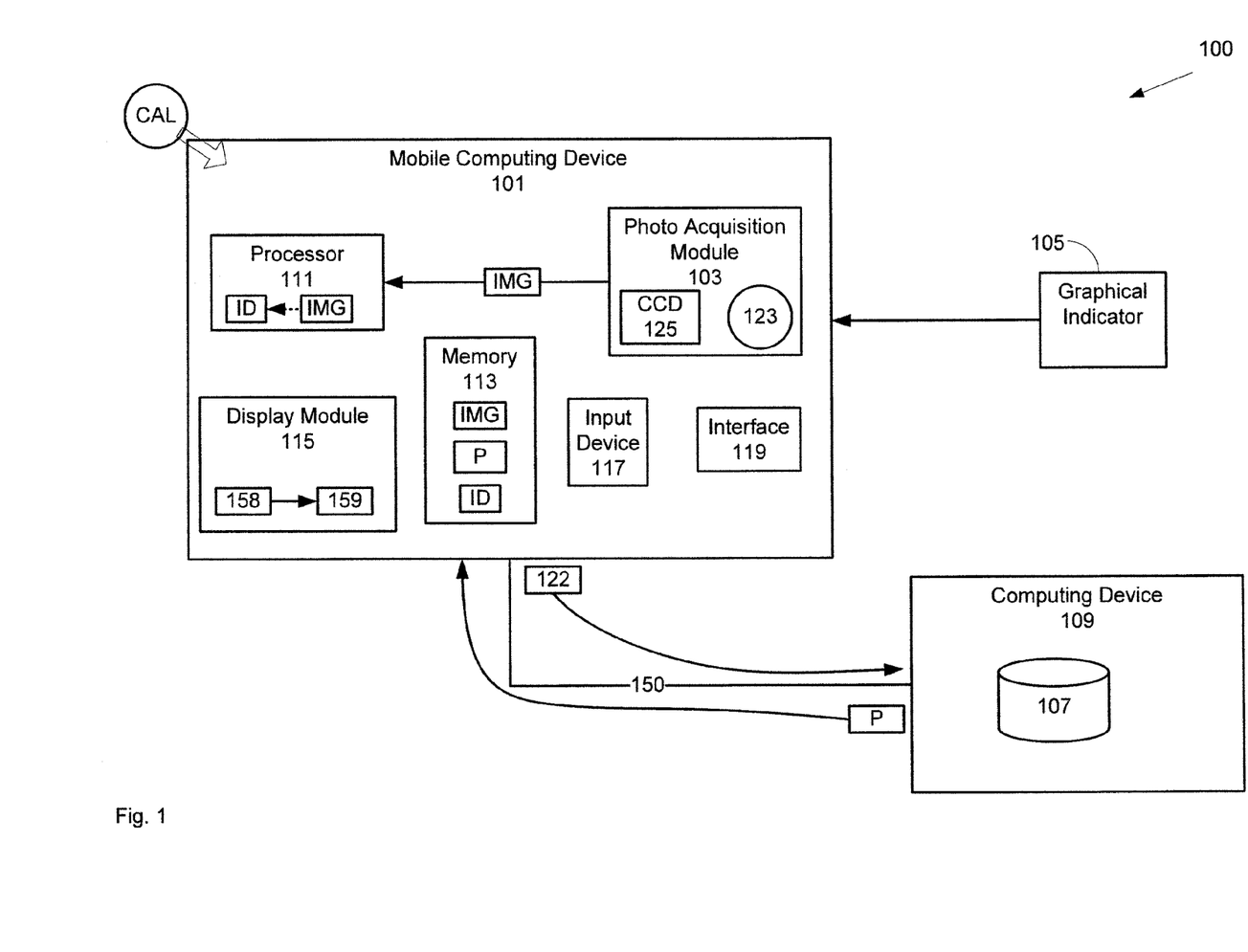
FIGS. 1 to 5 depict systems for sharing a calendar database, according to non-limiting embodiments.

FIG. 1 depicts a system 100 for sharing a calendar database with a mobile computing device 101. Mobile computing device 101 generally enabled to acquire, at a photo acquisition module 103, an image IMG of a graphical indicator 105 of a calendar database 107, calendar database 107 stored at a second computing device 109. The mobile computing device 101 generally comprises photo acquisition module interconnected with a processor 111 and a memory 113, for example via a computer bus. The mobile computing device can further comprise a display module 115, an input device 117 and a communications interface 119, interconnected with processor 111.

While in depicted embodiments, image IMG is acquired via photo acquisition module 103, in other embodiments, image IMG can be acquired by receiving image IMG via communications with an external device and/or by receiving a selection of image IMG from amongst one or more digital images stored at memory 113 of the mobile computing device 101, the selection received via input device 117. For example, image IMG can be received via a communication network (e.g. as an attachment to an e-mail) and stored in memory 113.

It is further understood that image IMG can be acquired via photo acquisition module 103 by at least one of scanning graphical indicator 105 and taking a photograph of graphical indicator 105.

In general, it is understood that graphical indicator 105 comprises any suitable optical machine readable representation of data identifying calendar database 107, generally indicated by identifier ID, for example a network address of computing device 109, such that at least a portion P of calendar database 107 can be requested via link 150, for example via request data 122. Link 150 can be wireless or wired as desired; link 150 can further comprise any suitable communication network. For example, graphical indicator 105 can comprise any suitable barcode including but not limited to a linear barcode (e.g. a UPC barcode) and a 2D barcode (e.g. a QR (Quick Response) code), and the like, generated using identifier ID. As depicted graphical indicator 105 comprises a QR code, however this is not be considered particularly limiting.

In any event, after image IMG is acquired, image IMG can be processed by processor 111 to extract identifier ID of calendar database 107, identifier ID enabling mobile computing device 101 to access calendar database 107, to retrieve at least a portion P of calendar database 107 from computing device 109, as described below.

Once image IMG is acquired (via photo acquisition module 103, via communications with an external device and/or by receiving a selection of image IMG from amongst one or more digital images stored on memory 113), image IMG can be conveyed to processor 111 for processing, and/or to display module 115 for display and/or to memory 113 for storage.

In some embodiments, photo acquisition module 103, if present, generally comprises a lens 123 and a charge coupled device (CCD) 125, and the like, for acquiring image IMO, as known to a person of skill in the art. Alternatively, in place of lens 123, photo acquisition module 103 can comprise a pinhole.

Memory 113 can comprise any suitable memory including but not limited to volatile memory, non-volatile memory, read-only memory (ROM), random access memory (RAM), flash memory, removable memory, a hard disk, and the like.

The display module 115 can include, but is not limited to, a flat panel display (e.g. a liquid crystal display (LCD), plasma, and the like), a cathode ray tube (CRT), a computer monitor, and the like. Display module 115 comprises circuitry 158 for generating a representation 159 of portion P and/or image IMG. Display module 115 can include any suitable combination of CRT and/or flat panel displays (e.g. LCD, plasma and the like), and circuitry 158 can include any suitable combination of circuitry for controlling a CRT and/or flat panel displays etc., including but not limited to display buffers, transistors, electron beam controllers, LCD cells, plasmas cells, phosphors etc. In particular, display module 115 and circuitry 158 can be controlled by processor 111 to generate representation 159.

Input device 117 can comprise any suitable input device for accepting input data including but not limited to button(s), a keyboard, a track ball, a scroll wheel and/or a combination. In particular, in some embodiments, the input device 117 enables the receipt of a selection of image IMG if stored in memory 113.

Interface 119 can comprise any suitable combination of wired or wireless interface as desired. In particular, the interface 119 enables communication between mobile computing device 101 and second computing device 109 via a link 150, such that at least a portion of calendar database 107 can be retrieved. Link 150 can be wireless or wired as desired; link 150 can further comprise any suitable communication network. Interface 119 is generally compatible with link 150. That is, if link 150 comprises a wireless link, interface 119 is enabled to communicate wirelessly, using any suitable protocol; and/or if link 150 comprises a wired link, then interface 119 is enabled to communicate via a wired link, using any suitable wired protocol.

In exemplary embodiments depicted in FIG. 1, the mobile computing device 101 can further comprise a calendaring application CAL, which can be stored in the memory 113 and processed by the processor 111. Upon processing the calendaring application CAL, the mobile computing device 101 is enabled to provide calendar functionality based at least in part on the portion P of calendar database 107 retrieved from computing device 109. For example, the mobile computing device 101 is enabled to provide reminders for events stored in the at least a portion P, stored in memory 113.

In some embodiments, the mobile computing device 101 comprises at least one of a PDA, a portable communications device, a portable computing device, a mobile telephone and the like. In these embodiments, the mobile computing device 101 can be further enabled to process e-mail, text messages, mobile telephone calls, browser applications and the like.

In some embodiments, computing device 109 can comprise any suitable server storing calendar database 107, for example a web-based calendar server. In other embodiments, computing device 109 can comprise a mobile computing device similar to mobile computing device 101; in these embodiments, computing device 109 can comprise a display module for providing graphical indicator 105. Various embodiments of computing device 109 and the like will be described hereafter.

In general there are at least four non-limiting embodiments whereby mobile computing device 101 can acquire image IMG:

1. Via a displayed depiction of graphical indicator 105, independent of a computing device.

Figure 2:
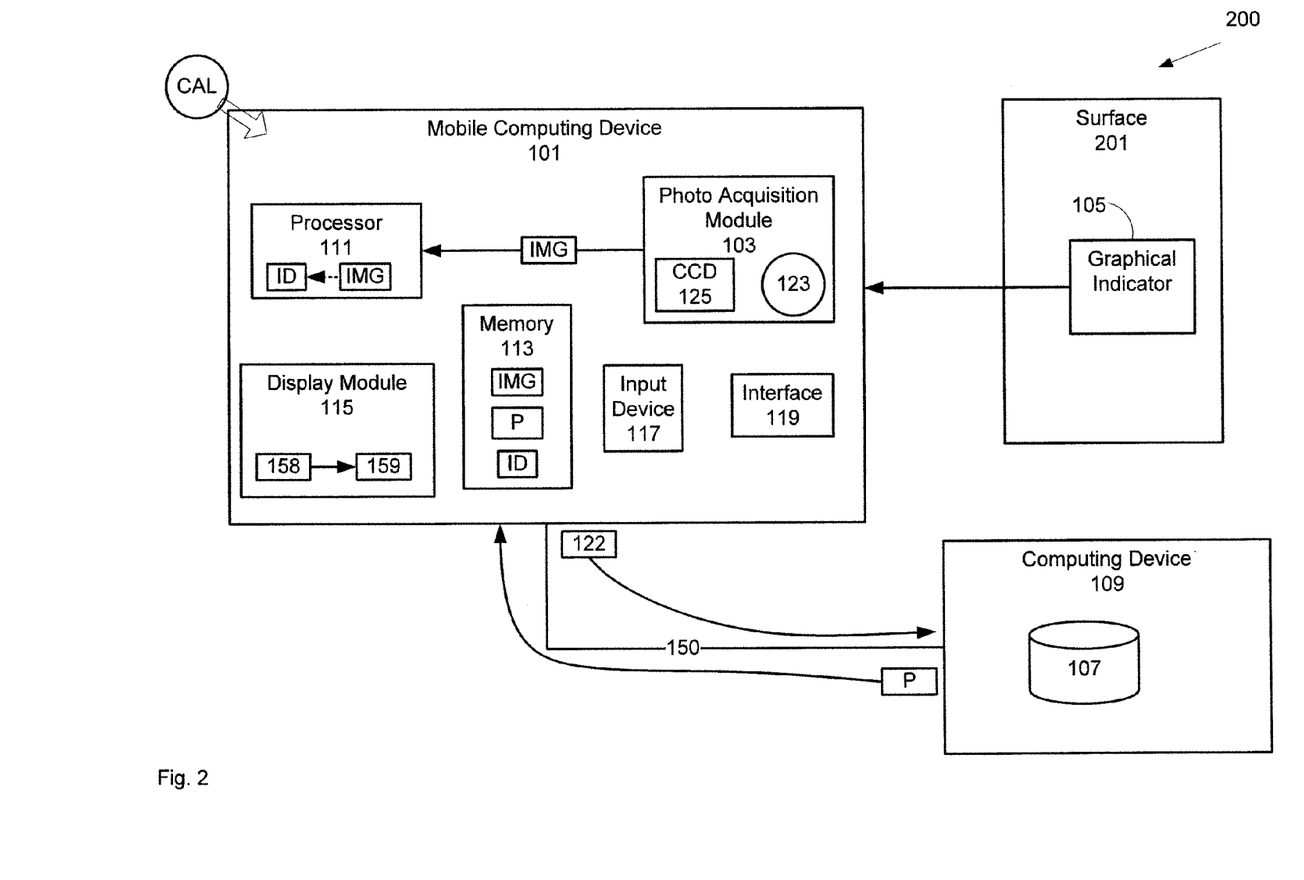

In system 200, as depicted in FIG. 2, which is substantially similar to FIG. 1, with like elements having like numbers, graphical indicator 105 can be displayed on a surface 201. Surface 201 can be any suitable surface for displaying graphical indicator 105 including but not limited to a wall, a poster, and an electronic display (e.g. a CRT, a flat panel display and the like). For example, surface 201 can be associated with an entity wishing to share calendar database 107 with any mobile computing device (e.g. mobile computing device 101): e.g. entities such as educational institutions can make a class schedule generally available and entities such as clubs can make a schedule of bands etc., generally available. To accomplish this, an identifier (i.e. identifier ID) of calendar database 107 is simply embedded in graphical indicator 105, which is in turn provided at surface 201. The image IMG of graphical indicator 105 can then be acquired at mobile computing device 101 from surface 201, via photo acquisition module 103, identifier ID extracted from image IMG, and at least a portion of calendar database 107 retrieved from computing device 109 via request 122.

2. Via a display of a second computing device associated with calendar database 107, calendar database 107 stored at computing device 109.

Figure 3:
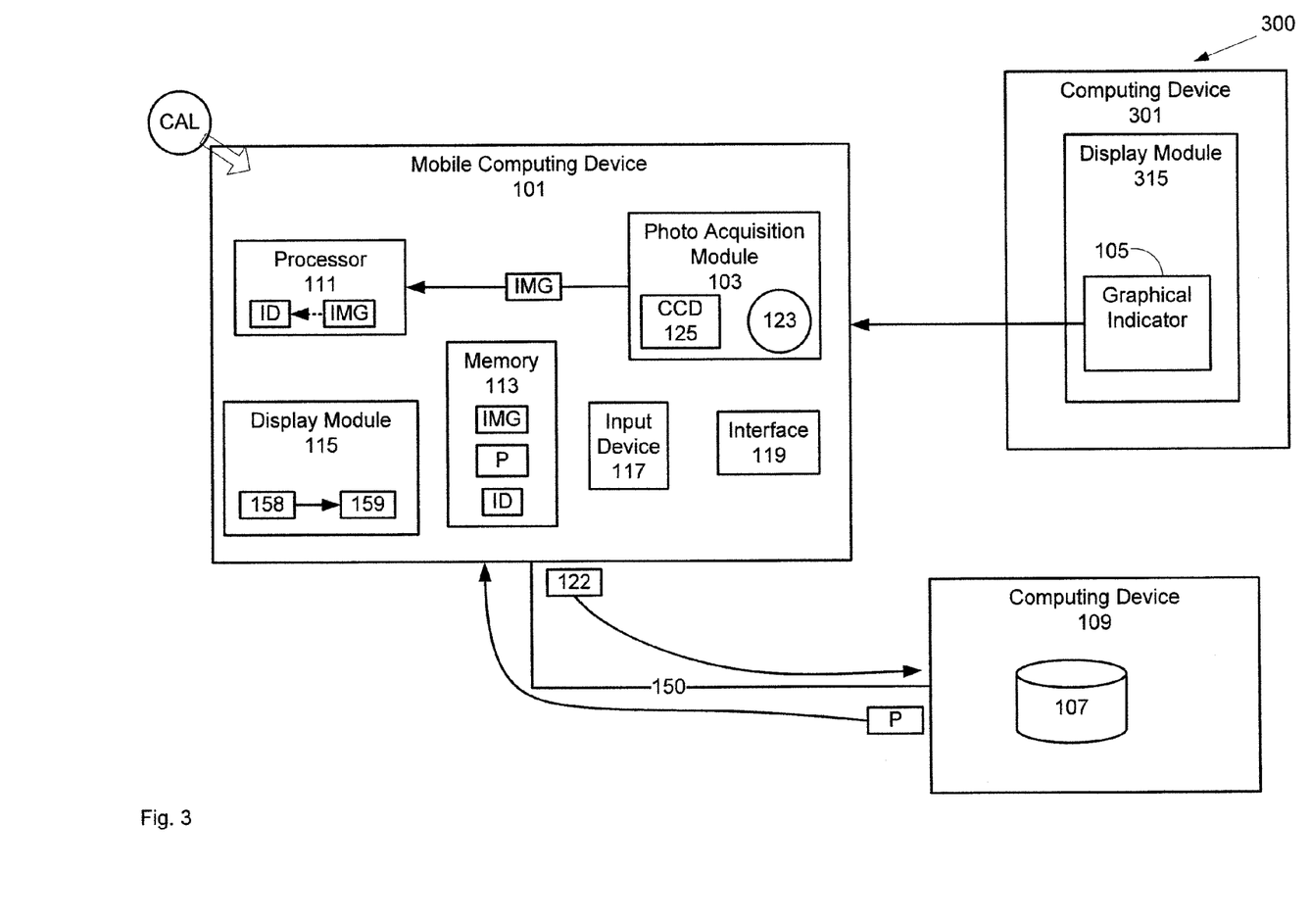

In system 300, as depicted in FIG. 3, which is substantially similar to FIG. 1, with like elements having like numbers, graphical indicator 105 can be displayed at a computing device 301, for example at a display module 315. Computing device 301 can be any suitable computing device having display module 315 associated therewith. In some embodiments, computing device 301 can be substantially similar to mobile computing device 101. For example, computing device 301 can be associated with an entity wishing to share calendar database 107 with mobile computing device 101. Hence, graphical indicator 105 is caused to be provided by display module 315: for example, upon receipt of input data at computing device 301, e.g. received via an input device (not depicted), a processor (not depicted) can control display module 315 to provide graphical indicator 105. The image IMG of graphical indicator 105 can then be acquired at mobile computing device 101 from display module 315, via photo acquisition module 103, identifier ID extracted from image IMG, and at least a portion of calendar database 107 retrieved from computing device 109 via request 122. Furthermore, if computing device 301 comprises a mobile computing device, display module 315 will generally have a small surface area, lending privacy and/or security to the acquisition of image IMG in that both mobile computing device 101 and computing device 301 can be physically arranged such that image IMG can only be acquired by mobile computing device 101 (e.g. no other computing device can acquire an image of graphical indicator 105 unless display module 315 of computing device 301 is allowed to be within a field of site of another photo acquisition module).

3. Via a display of a computing device storing calendar database 107.

Figure 4:
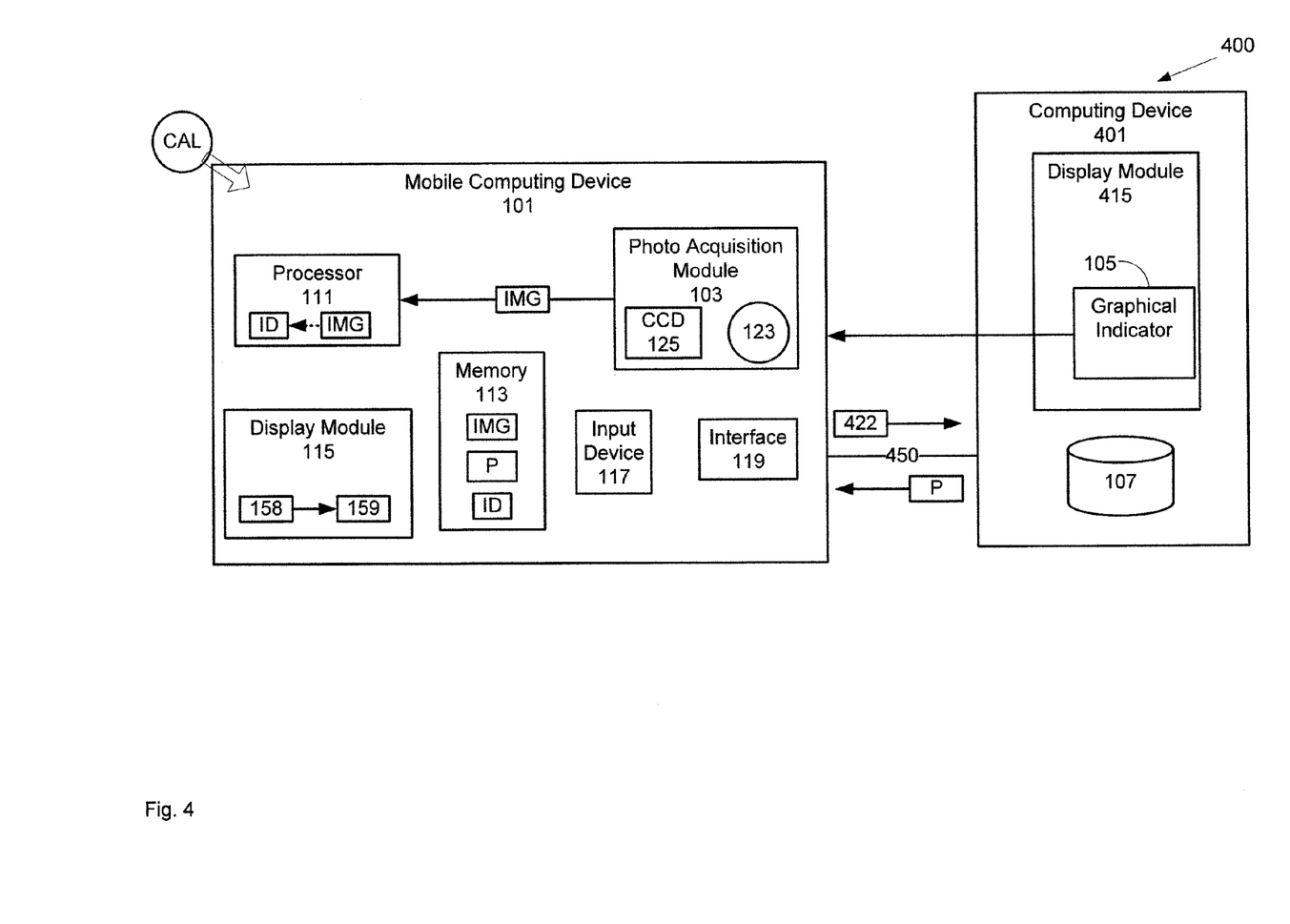

In system 400, as depicted in FIG. 4, which is substantially similar to FIG. 1, with like elements having like numbers, graphical indicator 105 can be displayed at a computing device 401, for example at a display module 415. Computing device 401 can be any suitable computing device having display module 415 associated therewith. Furthermore, rather than calendar database 107 being stored at a remote computing device such as computing device 109, in these embodiments calendar database 107 is stored at computing device 401, e.g. in a memory (not depicted). In some embodiments, computing device 401 can be substantially similar to mobile computing device 101 or computing device 301. For example, computing device 401 can be associated with an entity wishing to share calendar database 107 with mobile computing device 101. Hence, graphical indicator 105 is caused to be provided by display module 415: for example, upon receipt of input data at computing device 401, e.g. received via an input device (not depicted), a processor (not depicted) can control display module 415 to provide graphical indicator 105. The image IMG of graphical indicator 105 can then be acquired at mobile computing device 101 from surface 201, via photo acquisition module 103, identifier ID extracted from image IMG. A link 450 can then be established between mobile computing device 101 and computing device 401 and at least a portion of calendar database 107 retrieved from computing device 109 via a request 422. Link 450 can be similar to link 150, however in some embodiments link 450 can be a local wireless link between mobile communication device 101 and computing device 401, for example via a Bluetooth™ link established between mobile communication device 101 and computing device 401.

Furthermore, similar to embodiments described above with reference to FIG. 3, if computing device 401 comprises a mobile computing device, display module 415 will generally have a small surface area, lending privacy and/or security to the acquisition of image IMG in that both mobile computing device 101 and computing device 401 can be physically arranged such that image IMG can only be acquired by mobile computing device 101 (e.g. no other computing device can acquire an image of graphical indicator 105 unless display module 415 of computing device 401 is allowed to be within a field of site of another photo acquisition module).

4. Via a communication network.

Figure 5:
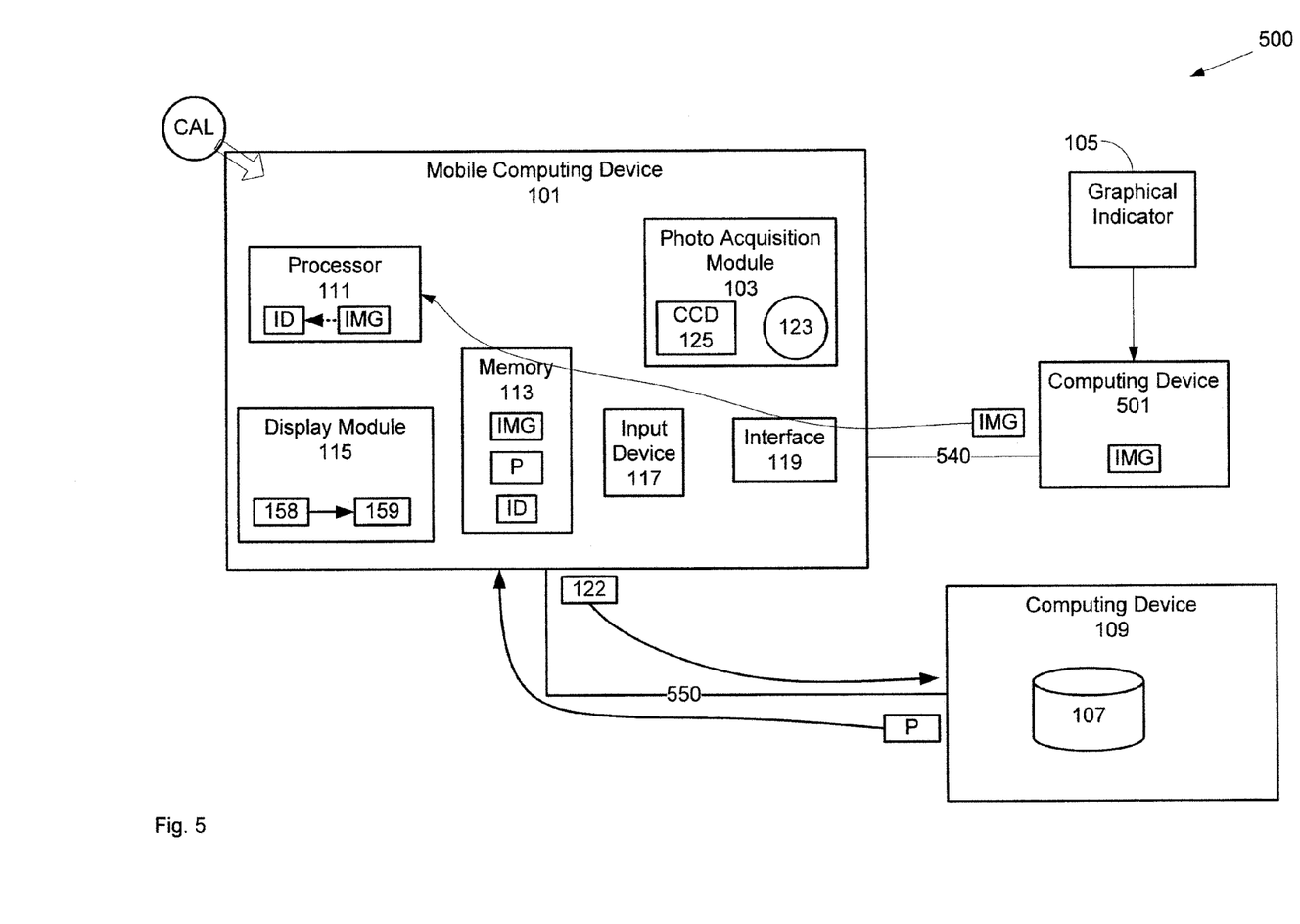

In system 500, as depicted in FIG. 5, which is substantially similar to FIG. 1, with like elements having like numbers, graphical indicator 105 can be first acquired at a computing device 501 in any manner described above with reference to FIGS. 1 to 4. While not depicted, it is generally understood that computing device 501 is generally similar to mobile computing device 101 and comprises a processor interconnected with at least a photo acquisition module, a memory, and an interface, each respectively similar to processor 111, photo acquisition module 103, memory 113 and interface 119. In any event, once image IMG is acquired at computing device 501, image IMG can be transmitted to mobile computing device 101 via a link 540, which can be similar to link 150 and comprise any suitable communication network. For example, image IMG can be transmitted via e-mail to mobile computing device 101 and identifier ID extracted therefrom, by processor 111 as described above. Link 150 can then be established between mobile computing device 101 and computing device 109 and at least a portion of calendar database 107 retrieved from computing device 109 via request 122.

Figure 6:
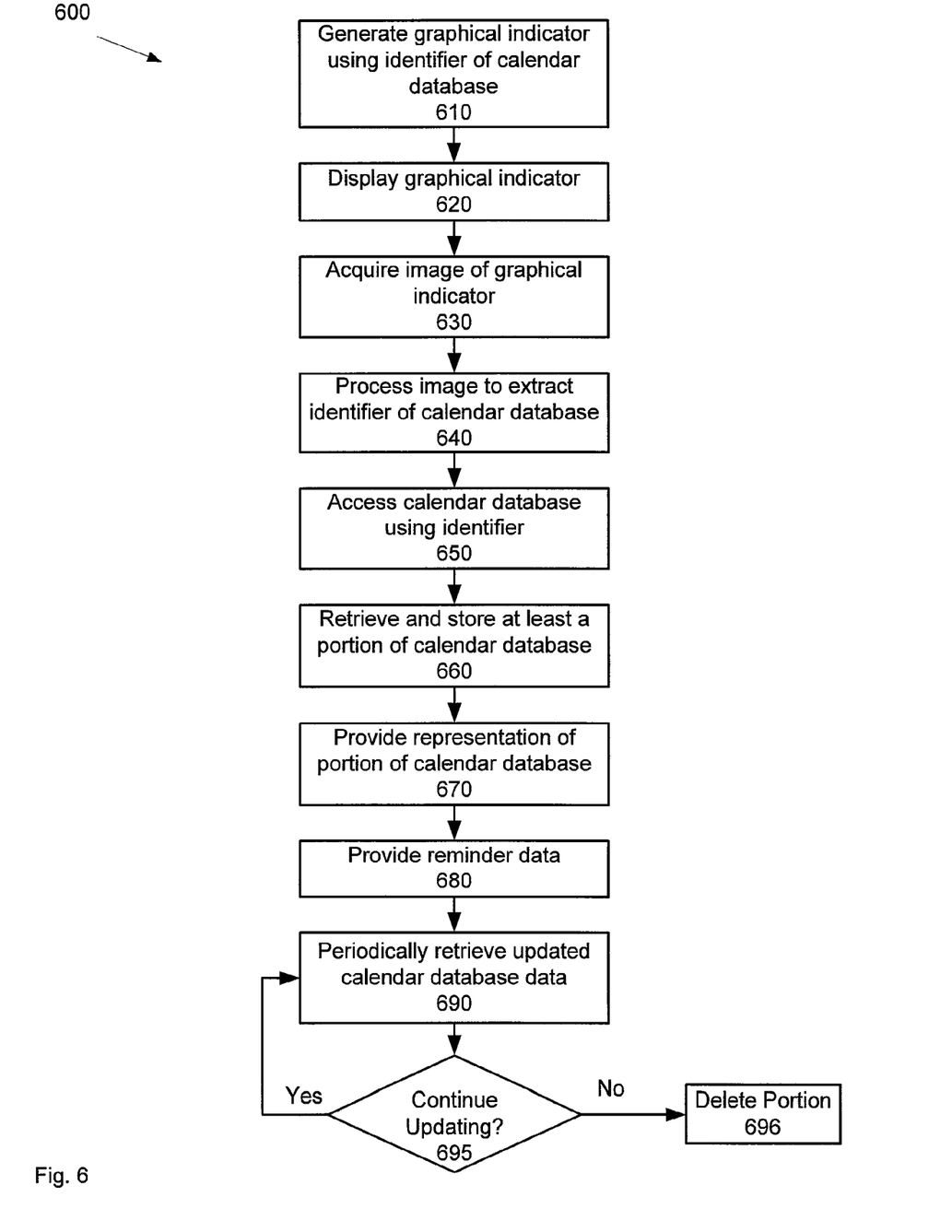
FIG. 6 depicts a method for sharing a calendar database, according to non-limiting embodiments.

Attention is now directed to FIG. 6 which depicts a method 600 for sharing a calendar database with a mobile computing device, according to non-limiting embodiments. In order to assist in the explanation of the method 600, it will be assumed that the method 600 is performed using at least one of systems 100-500. Furthermore, the following discussion of the method 600 will lead to a further understanding of the systems 100-500 and their various components. However, it is to be understood that the systems 100-500 and/or the method 600 can be varied, and need not work exactly as discussed herein in conjunction with each other, and that such variations are within the scope of present embodiments.

At step 610, graphical indicator 105 is generated. Graphical indicator 105 can be generated by any suitable computing device, using identifier ID of calendar database 107 as input data. In some non-limiting embodiments at least one of computing devices 109, 301, and 401 can be enabled to generate graphical indicator 105. In other non-limiting embodiments, graphical indicator 105 can be generated by a remote computing device and stored by at least one of computing devices 301, and 401 for display upon request, for example upon receipt of input data. For example, a QR code generator can be accessed via a communication network (e.g. via the Internet) and appropriate text input into the QR code generator such as a network address of calendar database 109.

At step 620, in some embodiments, graphical indicator 105 is displayed in any suitable format such that image IMG can be acquired. For example, graphical indicator 105 can be displayed at surface 201, at display module 315 and/or at display module 415.

At step 630, image IMG of graphical indicator 105 of calendar database 107 is acquired at mobile computing device 101. In some embodiments, image IMG of graphical indicator 105 is acquired at photo acquisition module 103 (e.g. a photo of graphical indicator 105 is acquired). In other embodiments, image IMG of graphical indicator 105 is acquired via a computer network, as described above with reference to FIG. 5. It is generally understood that calendar database 107 is stored at a second computing device, such as computing devices 109 and 401.

At step 640, image IMG of graphical indicator 105 is processed at processor 111, to extract identifier ID of calendar database 107 in order to access calendar database 107 and store at least a portion P of calendar database 107 in memory 113.

At step 650, calendar database 107 is accessed by mobile computing device 101, for example by transmitting request 122 (or 422) to computing device 109 (or, respectively, computing device 401), using identifier ID, such that at step 660 at least a portion of calendar database 107 is retrieved for storage in memory 113.

In some embodiments, at step 670, a representation of portion P can be provided at display module 115, for example in representation 159 of calendar application CAL. In other embodiments, at step 680 at least one reminder of event data stored in portion P can be generated at display module 115. In some embodiments, portion P can be stored in memory 113 only while calendar application CAL is in a shared calendar mode, and deleted once calendar application CAL is closed and/or calendar application CAL is controlled to no longer access portion P and/or calendar application CAL is controlled to no longer be in a shared calendar mode. In these embodiments, identifier ID is also stored in memory 113 such that calendar database 107 can be accessed, and portion P retrieved, whenever calendar application CAL is in shared calendar mode and/or processed to access calendar database 107. In other embodiments, portion P can be stored in memory 113 for access whenever calendar application CAL is in a shared calendar mode (i.e. in long term volatile storage, as appropriate).

In some embodiments, graphical indicator 105 can further comprise at least a first portion of portion P: for example at least a subset of portion P can be embedded in graphical indicator 105 when graphical indictor 105 is generated at step 610. It is understood that at least a portion event data of the calendar database 107 is graphically embedded in graphical indicator 105. In any event, in these embodiments, at step 640, processing image IMG of graphical indicator 105 can further comprise extracting at least a subset of portion P from graphical indicator 105.

In some embodiments, method 600 further comprises, at step 690, periodically accessing computing device 109 (or computing device 401) to retrieve updated calendar data from calendar database 107. For example, a request similar to request 122 (and/or request 422) can be transmitted periodically to retrieve updated calendar data from calendar database 107, such that the at least a portion P can be updated if calendar database 107 is updated. Updated calendar data can be differential data or full download of at least an updated portion of calendar database 107, as desired.

In some of these embodiments, a decision can be made at step 695 if periodic updates are to continue. For example, if attempts to retrieve updated calendar data are unsuccessful for at least one of a given number of times and a given time period, the at least a portion P can be deleted from memory 113 at step 969, as for example, the calendar database 107 is no longer being maintained or can have been deleted. In yet further embodiments, if updated calendar data comprises no future events for at least one of a given number of access events, and a given time period, the at least a portion P can be deleted from memory 113 at step 969, as for example, the calendar database 107 is no longer being maintained and/or all events associated with calendar database 107 have occurred (e.g. a term for a class schedule is complete). In some of these embodiments, where a final event within calendar database 107 has just completed and calendar database 107 has no future events. Prior to deleting the at least a portion P, computing device 107 can be queried as whether a new version of calendar database 107 exists. This can be useful for automatically obtaining event calendars for the New Year, for example.

In any event, by acquiring, at a mobile computing device, an image of a graphical indicator of a calendar database, the calendar database stored at a second computing device, and processing the image to extract an identifier of the calendar database, the calendar database is easily and efficiently shared. Furthermore, this saves wear and tear at input devices of mobile computing device, and furthermore obviates a need to access a calendar service website in order to share databases. In addition, some present embodiments take advantage of photo acquisition devices becoming ubiquitous in mobile computing devices and, when combined with increasingly ubiquitous QR codes (and other barcodes), enables the sharing of a calendar database via embedding an identifier of calendar database in the QR code at one device and extracting the identifier after acquiring an image of the QR code at a second device.

Those skilled in the art will appreciate that in some embodiments, the functionality of mobile computing device 101, and computing devices 109, 301, 401, 501 can be implemented using pre-programmed hardware or firmware elements (e.g., application specific integrated circuits (ASICs), electrically erasable programmable read-only memories (EEPROMs), etc.), or other related components. In other embodiments, the functionality of mobile computing device 101, and computing devices 109, 301, 401, 501 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for sharing a calendar database with a mobile computing device, the calendar database stored at a second computing device, the mobile computing device comprising a processer and, interconnected thereto, a display, a memory and a photo acquisition module, the method comprising:
    acquiring, at the mobile computing device, an image of a graphical indicator of the calendar database, at least a portion of the calendar database and an identifier of the calendar database both graphically embedded in the graphical indicator; and
    processing the image of the graphical indicator to:
        extract the portion of the calendar database;
        extract, at the processor, the identifier of the calendar database to access the calendar database;
        store the portion of the calendar database in the memory;
        provide, at the display, a representation of the portion in a calendar application of the mobile computing device;
        periodically access the calendar database to acquire updated calendar data from the calendar database; and
    deleting the portion of the calendar database from the memory when the updated calendar data fails to contain new event data for at least one of a given number of times and a given time period.

2. The method of claim 1, wherein the image is acquired at the photo acquisition module.

3. The method of claim 1, further comprising generating, at the display, at least one reminder of event data stored in the portion.

4. The method of claim 1, wherein the processing the image of the graphical indicator to periodically access the calendar database to acquire the updated calendar data from the calendar database further comprises:
    transmitting the identifier to the second computing device via a communications network; and
    receiving the updated calendar data from the second computing device.

5. The method of claim 4, wherein the graphical indicator of the calendar database is generated by the second computing device, and the acquiring, at the mobile computing device, the image of the graphical indicator of the calendar database comprises acquiring the image of the graphical indicator from a display of the second computing device.

6. The method of claim 4, wherein the graphical indicator of the calendar database is generated by a third computing device, and the acquiring, at the mobile computing device, the image of the graphical indicator of the calendar database comprises acquiring the image of the graphical indicator from a display of the third computing device.

7. The method of claim 4, wherein the communications network comprises at least one of a wireless network, a wired network and a local communications network established between the mobile computing device and the second computing device.

8. The method of claim 4, wherein the second computing device comprises a calendar server.

9. The method of claim 1, further comprising deleting the portion of the calendar database from the memory when an attempt of the periodic attempts to access the second computing device is unsuccessful for at least one of a given number of times and a given time period.

10. A mobile computing device for sharing a calendar database stored at a second computing device, the mobile computing device comprising:
    a processor and, interconnected thereto, a display, a memory and a photo acquisition module, the processor enabled to:
        acquire, via the photo acquisition module, an image of a graphical indicator of the calendar database, at least a portion of the calendar database and an identifier of the calendar database both graphically embedded in the graphical indicator;
        process the image of the graphical indicator to:
            extract the portion of the calendar database;
            extract the identifier of the calendar database to access the calendar database;
            store the portion of the calendar database in the memory;
            control the display to provide a representation of the portion in a calendar application of the mobile electronic device;
            periodically access the calendar database to acquire updated calendar data from the calendar database; and
        delete the portion of the calendar database from the memory when the updated calendar data fails to contain new event data for at least one of a given number of times and a given time period.

11. The mobile computing device of claim 10, wherein the processor is further enabled to control the display to generate at least one reminder of event data stored in the portion.

12. The mobile computing device of claim 10, wherein to process the image of the graphical indicator of the calendar database to periodically acquire the updated calendar data from the calendar database, the processor is further enabled to:
    transmit the identifier to the second computing device via a communications network; and
    receive the updated calendar data from the second computing device.

13. The mobile computing device of claim 12, wherein the graphical indicator of the calendar database is generated by the second computing device, and wherein to acquire the image of the graphical indicator of the calendar database, the processor is enabled to acquire the image of the graphical indicator from a display of the second computing device.

14. The mobile computing device of claim 12, wherein the graphical indicator of the calendar database is generated by a third computing device, and wherein to acquire the image of the graphical indicator of the calendar database, the processor is enabled to acquire the image of the graphical indicator from a display of the third computing device.

15. The mobile computing device of claim 12, wherein the communications network comprises at least one of a wireless network, a wired network and a local communications network established between the mobile computing device and the second computing device.

16. The mobile computing device of claim 10, wherein the processor is further configured to delete the portion of the calendar database from the memory when an attempt of the periodic attempts to access the second computing device is unsuccessful for at least one of a given number of times and a given time period.

* * * * *